(12) United States Patent
Arita (10) Patent No.: US 10,613,378 B2
(45) Date of Patent: Apr. 7, 2020

(54) BACKLIGHT AND DISPLAY (71) Applicant: Mitsubishi Electric Corporation, Tokyo (JP)

(72) Inventor: Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/214,226

(22) Filed: Dec. 10, 2018

(65) Prior Publication Data

US 2019/0227380 A1 Jul. 25, 2019

(30) Foreign Application Priority Data

Jan. 22, 2018 (JP) .................. 2018-007845

(51) Int. Cl.
*G02F 1/1333* (2006.01)
*G02F 1/1335* (2006.01)
*F21V 8/00* (2006.01)

(52) U.S. Cl.
CPC ..... *G02F 1/133602* (2013.01); *G02B 6/0031* (2013.01); *G02B 6/0065* (2013.01); *G02B 6/0088* (2013.01); *G02F 1/133308* (2013.01); *G02F 1/133615* (2013.01); *G02B 6/0083* (2013.01)

(58) Field of Classification Search
CPC ......... G02F 1/133308; G02F 1/133317; G02F 1/133322; G02B 6/0088
See application file for complete search history.

(56) References Cited

U.S. PATENT DOCUMENTS

| 2004/0125267 | A1 | 7/2004 | Noh |
| 2006/0087803 | A1* | 4/2006 | Kim .................. G02F 1/133308 361/679.3 |
| 2008/0123336 | A1 | 5/2008 | Arita et al. |

FOREIGN PATENT DOCUMENTS

| JP | 2004-212930 A | 7/2004 |
| JP | 2008-135290 A | 6/2008 |

* cited by examiner

*Primary Examiner* — James A Dudek
(74) *Attorney, Agent, or Firm* — Studebaker & Brackett PC (57) ABSTRACT

Provided is a backlight capable of keeping display quality, and a display including the backlight. The backlight includes a molded frame and a rear frame that hold an optical member forming an area light source from the front and back sides of a light-outgoing surface of the area light source. The molded frame has a portion forming the frame of the area light source, and has molded-frame projections selectively disposed in this portion and facing the rear frame in the back-and-forth direction. The rear frame has a portion forming the frame of the area light source, and has rear-frame pockets selectively disposed in this portion and facing the molded frame in the back-and-forth direction. Each molded-frame projection and each rear-frame pocket are interlocked, and regulate a movement in the inward-and-outward direction.

14 Claims, 11 Drawing Sheets

BACKLIGHT AND DISPLAY

BACKGROUND OF THE INVENTION

Field of the Invention

The present invention relates to backlights and displays including the backlights. In particular, the present invention relates to a backlight irradiating a display panel having a curved display surface with light, and to a display including the backlight.

Description of the Background Art

The popularization of information electronic equipment encourages various fields to use displays having display panels whose front surfaces are covered with sturdy protectors. The display surfaces of some of these displays are integrated with touch panels or the protectors using transparent resin or other kinds of material, in order to prevent visibility degradation resulting from the surface reflection of external light, or to protect the displays from, for instance, external impact, water immersion, or dust. Moreover, a vehicle-installed display has been increasingly available that has an odd-shaped and curved display panel for highly designed car space.

A display serving as a liquid crystal display includes a backlight at the back of its display panel. The backlight includes a molded frame near the display panel. Reducing the width of the frame of a display region in order to prioritize design involves a reduction in the width of the frame of the molded frame. The backlight consists of optical members including a light source, the optical member being accommodated by a molded frame and a rear frame. The molded frame and the rear frame are interlocked and fastened.

Reference is made to a display having an odd-shaped and curved display surface, and having a narrow frame width of a display region. In such a display, the molded frame has a narrow frame width, and has an odd and curved shape. It is thus difficult to form a structure interlocking with the rear frame. Accordingly, a vibration or impact to the display oscillates the protector and thus deforms the molded frame to expand, thus releasing the interlock between the molded frame and the rear frame. This release generates gaps between components of the display. Water, dust, and other matters enter the inside of the display from the gaps, thus causing display abnormalities.

A conventional liquid crystal display includes the following: a backlight assembly that irradiates a liquid crystal panel with light; a main frame with the backlight assembly and the liquid crystal panel attached thereto, the main frame having an upper part provided with hook projections; and a case top having a plurality of hook plates located so as to be adjacent to the hook projections of the main frame. The hook plates of the case top are latched to the hook projections of the main frame, so that the hook plates are fastened to the hook projections. Such a liquid crystal display is disclosed in, for instance, Japanese Patent Application Laid-Open No. 2004-212930.

A structure without a case top, which is not described in Japanese Patent Application Laid-Open No. 2004-212930, cannot prevent water or dust entrance and keep display quality. In addition, Japanese Patent Application Laid-Open No. 2004-212930 is silent about the display having an odd-shaped and curved display surface, and having a narrow frame width of a display region. Hence, the display in Japanese Patent Application Laid-Open No. 2004-212930 cannot keep display quality.

To prevent the deformation or expansion of the molded frame with a narrow width, provided is a means for fastening the molded frame to the rear frame with tape. Unfortunately, age deterioration lowers tape adhesion, thus unsticking the tape. The molded frame and the rear frame are no longer fastened. This generates gaps between the components of the display. Water, dust, and other matters enter the inside of the display from the gaps, thus causing display abnormalities. Fastening the molded frame and the rear frame, which requires a tape strip, is costly.

SUMMARY

It is an objection of the present invention to provide a backlight capable of keeping display quality, and a display that includes the backlight.

A backlight according to one aspect of the present invention includes a first frame and a second frame that holds an optical member forming an area light source from the front and back sides of a light-outgoing surface of the area light source. A direction perpendicular to the light-outgoing surface is defined as a back-and-forth direction. A direction parallel to the light-outgoing surface is defined as an inward-and-outward direction. The first frame has a first portion forming the frame of the area light source, and has a plurality of first interlocking portions selectively disposed in the first portion and facing the second frame in the hack-and-forth direction. The second frame has a second portion forming the frame of the area light source, and has a plurality of second interlocking portions selectively disposed in the second portion and facing the first frame in the back-and-forth direction. Each first interlocking portion of the first frame and each second interlocking portion of the second frame are interlocked, and regulate a movement in the inward-and-outward direction.

The backlight according to the one aspect of the present invention includes the first frame and the second frame that holds the optical member forming the area light source from the front and back sides of the light-outgoing surface of the area light source. The direction perpendicular to the light-outgoing surface is defined as the back-and-forth direction; and the direction parallel to the same, the inward-and-outward direction. The first frame has the first portion forming the frame of the area light source, and has the plurality of first interlocking portions selectively disposed in the first portion and facing the second frame in the back-and-forth direction. The second frame has the second portion forming the frame of the area light source, and has the plurality of second interlocking portions selectively disposed in the second portion and facing the first frame in the back-and-forth direction. Each first interlocking portion of the first frame and each second interlocking portion of the second frame are interlocked, and regulate the movement in the inward-and-outward direction. Such a configuration keeps the display quality.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments will be described with reference to the drawings.

First Preferred Embodiment

<Configuration of Display>

Figure 1:
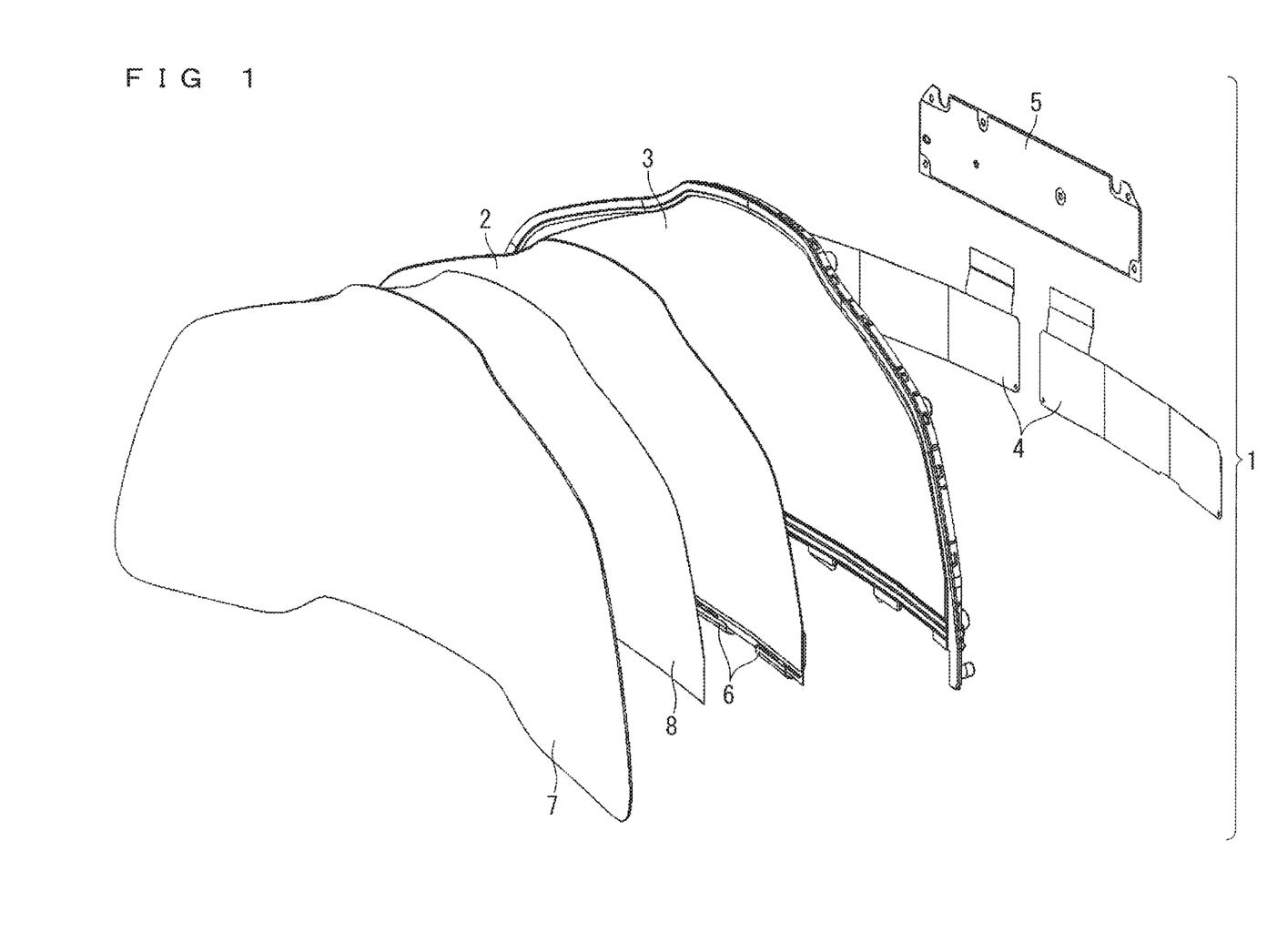
FIG. 1 is an exploded perspective view of one example of the configuration of a display according to a first preferred embodiment of the present invention.

FIG. 1 is an exploded perspective view of one example of the configuration of a display 1 according to a first preferred embodiment of the present invention. The display 1 herein is a liquid crystal display.

As illustrated in FIG. 1, the display 1 includes the following: a display panel 2 on which an image is displayed; a backlight 3 irradiating the display panel 2 with light from behind the display panel 2; and control flexible-printed-circuits (FPCs) 4 and a control substrate 5 that are disposed behind the backlight 3 and control the display panel 2. The display panel 2 includes strip FPCs 6 that transmit, to the display panel 2, a signal sent from the control FPCs 4. The display panel 2 has a display surface joined to a protector 7 with an adhesive 8. The protector 7 is made of a substantially transparent material, such as glass or plastic.

In the first preferred embodiment, the display surface of the display panel 2 is curved against a plane and symmetric with respect to an axis extending in the vertical direction of the drawing sheet. Further, the backlight 3 and the protector 7 are each shaped to conform with the shape of the display panel 2.

<Configuration of Backlight>

Figure 2:
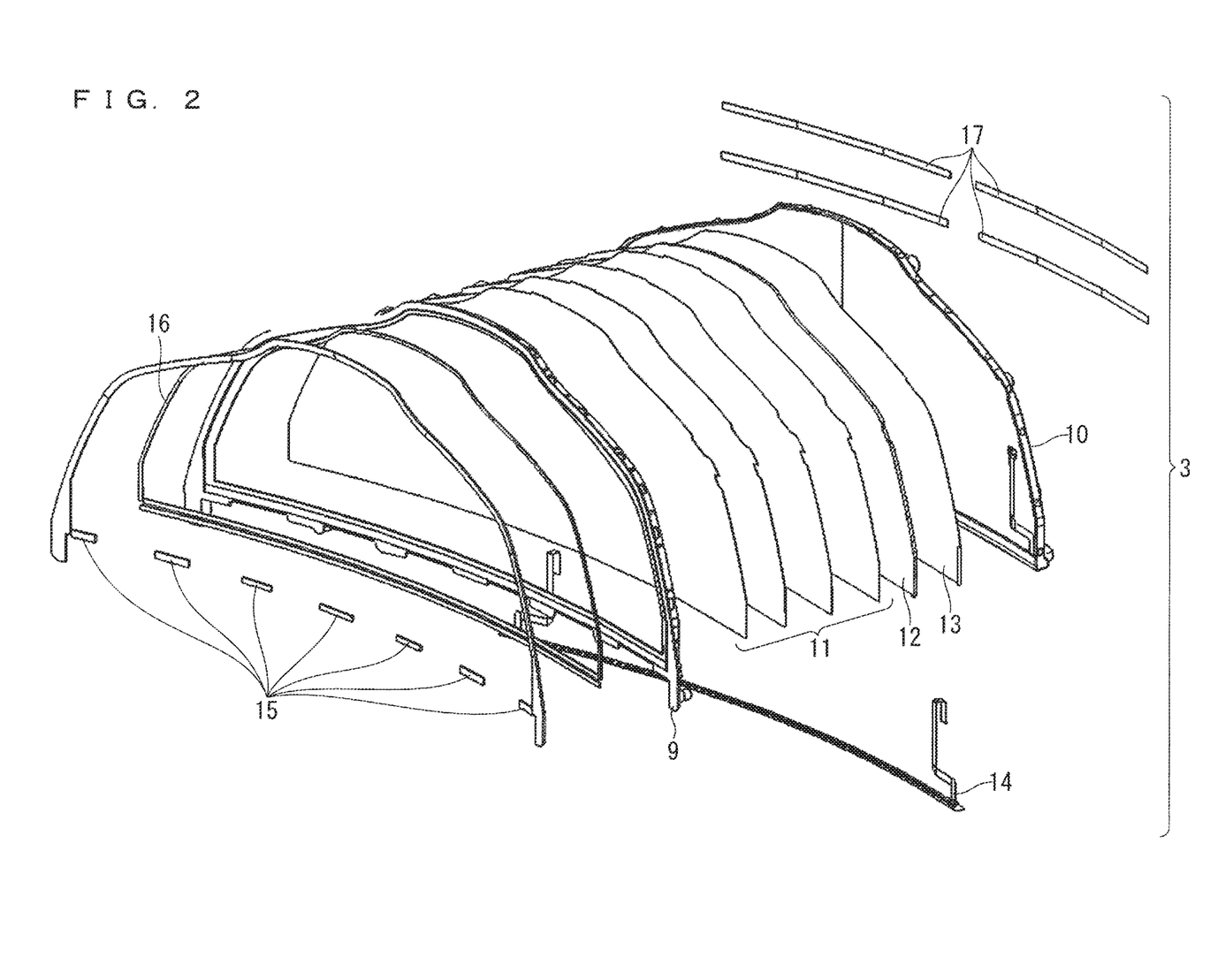
FIG. 2 is an exploded perspective view of one example of the configuration of a backlight according to the first preferred embodiment of the present invention.

FIG. 2 is an exploded perspective view of one example of the configuration of the backlight 3.

The backlight 3 includes the following: a molded frame 9, which is a first frame, and a rear frame 10, which is a second frame. The molded frame 9 and the rear frame 10 holds optical members that constitute an area light source from the front and back sides of a light-outgoing surface of the area light source. The optical members, constituting the area light source, are optical sheets 11, a light-guide plate 12, a reflection sheet 13, and a light source 14. Hereinafter, a direction perpendicular to the light-outgoing surface of the area light source is called a back-and-forth direction; and a direction parallel to the light-outgoing surface of the same, an inward-and-outward direction.

Figure 9:
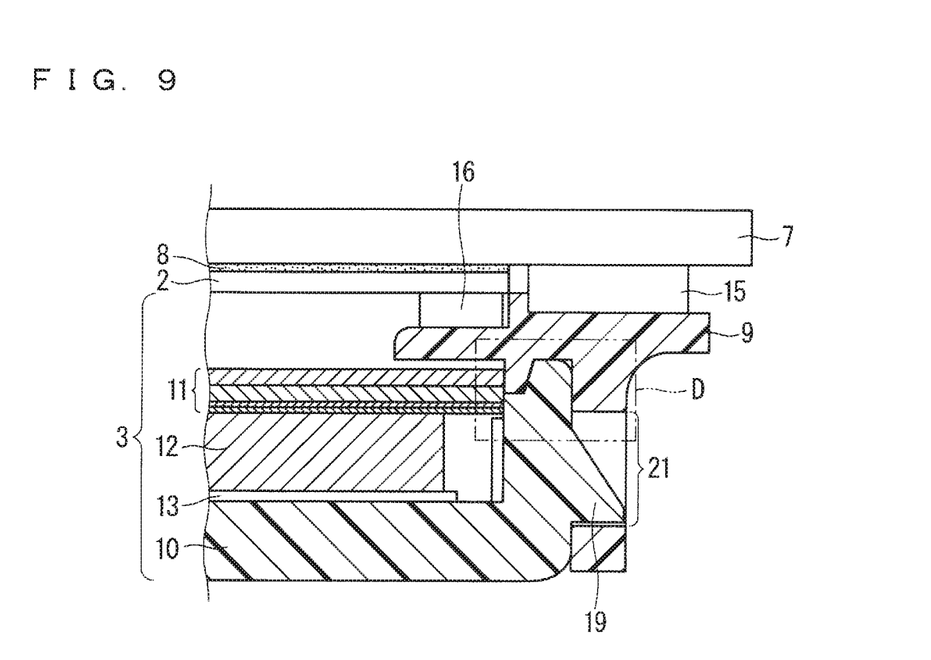
FIG. 9 is a cross-sectional view taken along line A-A in FIG. 3.

The molded frame 9 has a surface provided with connectors 15 that connect the protector 7 to the backlight 3, and with a panel cushion 16 that protects the back surface of the display panel 2 and holds the display panel 2. The protector 7 is disposed on the display panel of the display panel 2, and connected to the frame of the area light source via the connectors 15, as illustrated in FIG. 9, which will be described later on.

Disposed behind the rear frame 10 are connectors 17 that connect and fasten the backlight 3 to the control FPCs 4.

Figure 3:
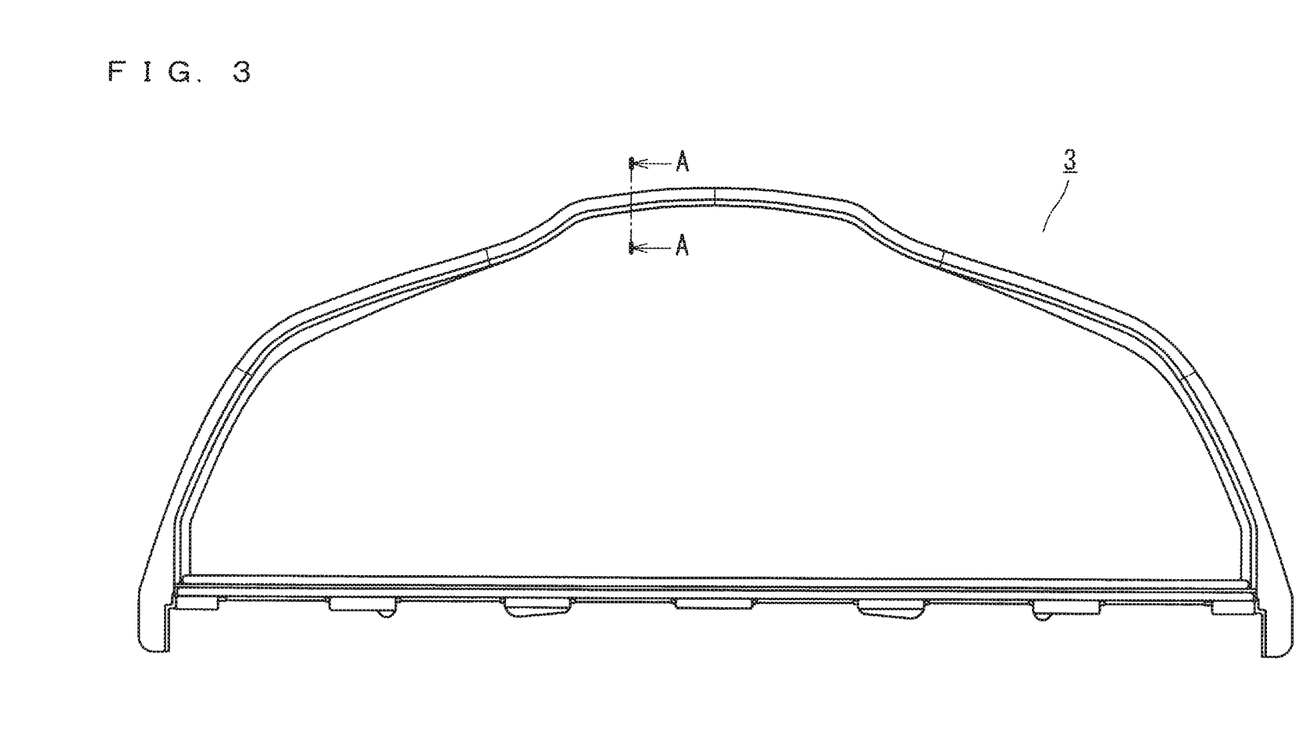
FIG. 3 is a front view of one example of the configuration of the backlight according to the first preferred embodiment of the present invention.
Figure 4:
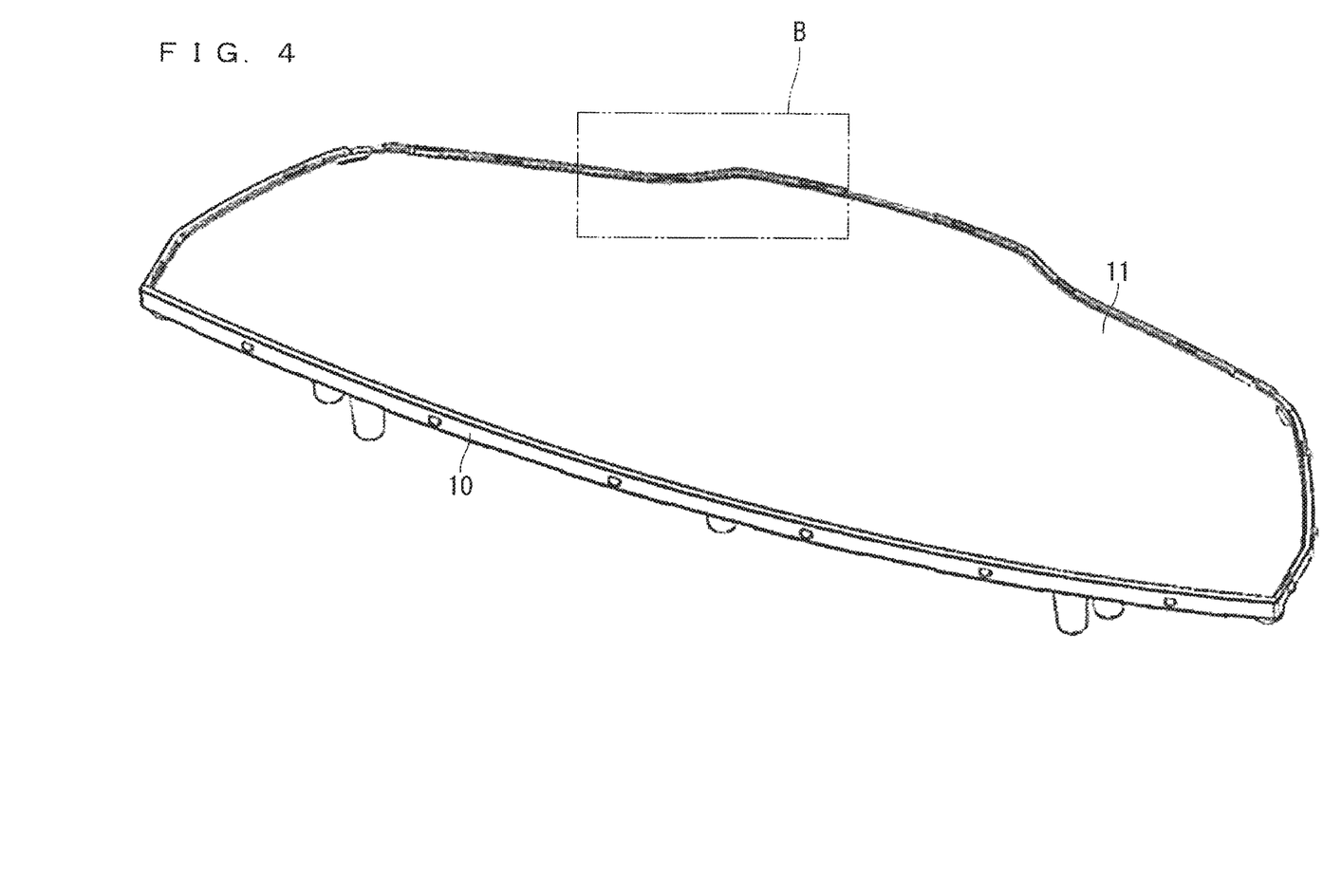
FIG. 4 is a perspective view of one example of the configuration of the backlight according to the first preferred embodiment of the present invention.
Figure 5:
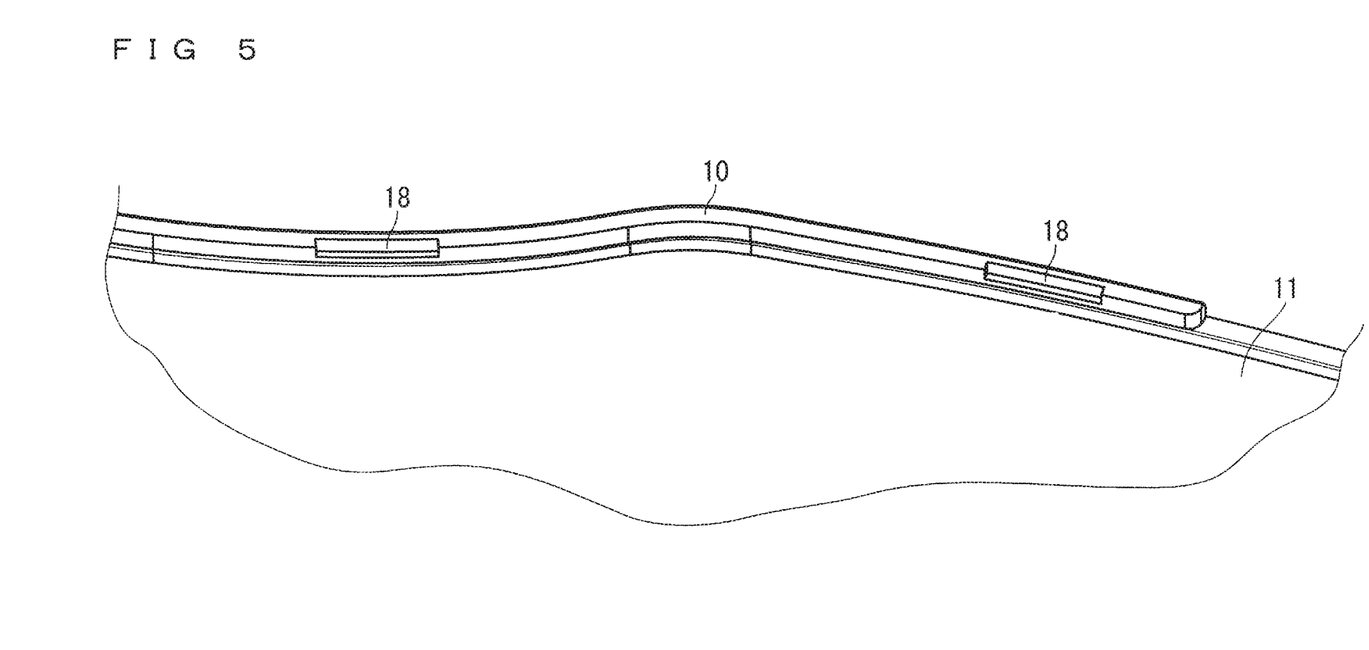
FIG. 5 is an enlarged view of a portion B in FIG. 4.

FIG. 3 is a front view of the backlight 3 viewed from the display panel 2. FIG. 4 is a perspective view of the backlight 3 viewed from the display panel 2. FIG. 5 is an enlarged view of a portion B in FIG. 4. FIGS. 4 and 5 do not show the molded frame 9, and shows the optical sheet 11 behind which the light-guide plate 12, the reflection sheet 13, and the light source 14 are disposed. As illustrated in FIGS. 4 and 5, the rear frame 10 has an outer periphery whose inner-wall surface is provided with rear-frame pockets 18, which are specifically illustrated in FIGS. 9 and 10. That is, the rear frame 10 has a portion forming the frame of the area light source, and has the plurality of rear-frame pockets 18 selectively disposed in this portion and facing the molded frame 9 in the back-and-forth direction. The rear-frame pockets 18 are second interlocking portions.

A pocket in the Specification means a space receiving a projection. For instance, the pocket may be a cut-out step, a dent or hole having a bottom, or a through-hole. The pocket extends to a direction in which the projection projects. The rear-frame pockets 18 extend in the back-and-forth direction.

Figure 6:
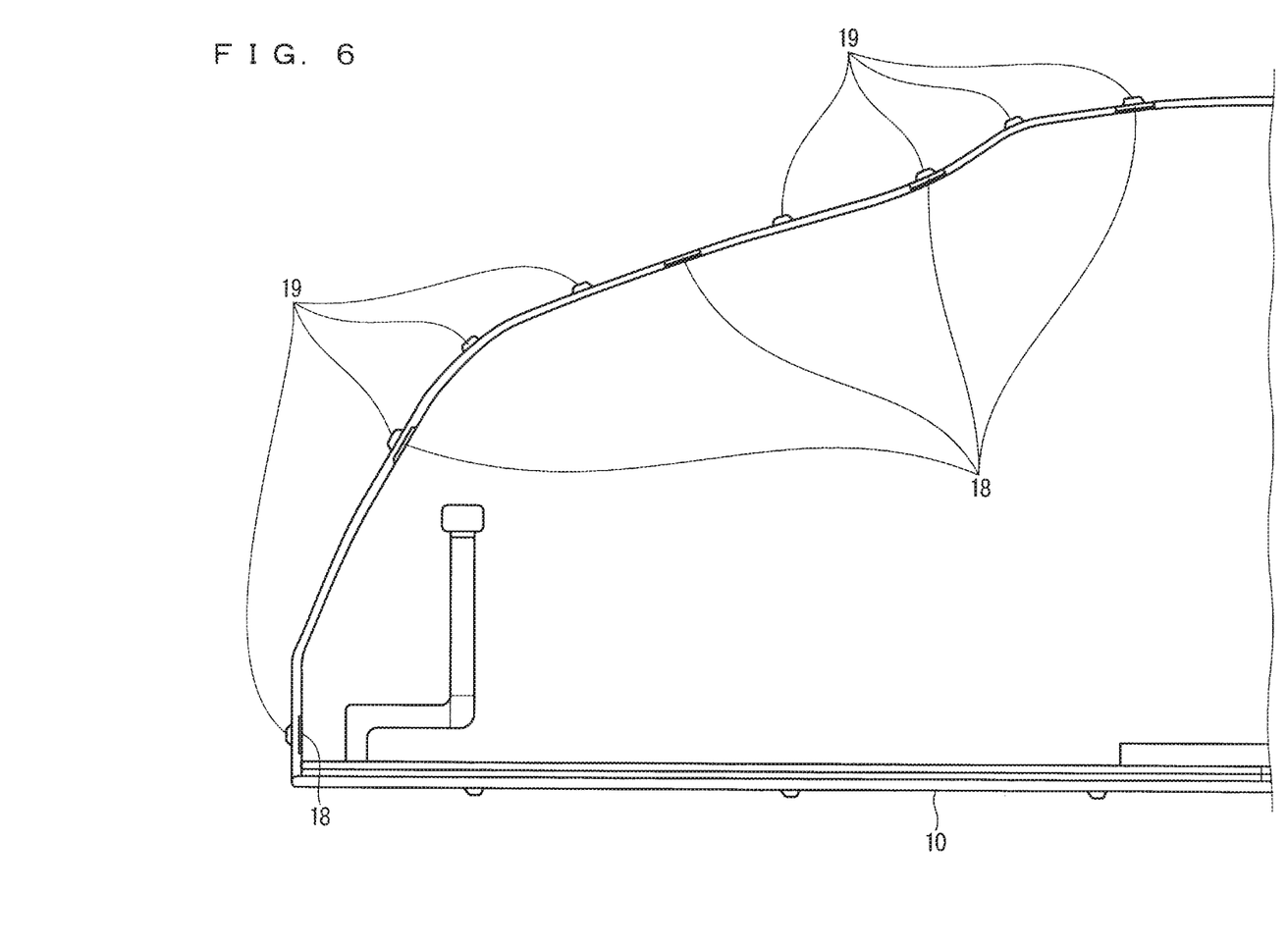
FIG. 6 is a front view of one example of the configuration of a rear frame according to the first preferred embodiment of the present invention.

FIG. 6 is a front view of the rear frame 10 viewed from the display panel 2. Although FIG. 6 only shows the left side of the symmetric rear frame 10, the right side of the same is similarly structured.

As illustrated in FIG. 6, the outer periphery of the rear frame 10 is provided with rear-frame projections 19 fitted and fastened to molded-frame holes 21 of the molded frame 9 illustrated in FIG. 8, which will be described later on. The molded frame 9 has a narrow frame width and an odd shape, and is curved. Accordingly, a simulation or other kinds of method is used to inspect the molded frame 9 for sites that have insufficient strength and are thus vulnerable to deformation. Then, positions in the rear frame 10, the positions corresponding to these sites, are set as optimal positions for the rear-frame projections 19. For instance, the rear-frame projections 19 are placed at change points of changes in shape in plan view, such as warp points. This placement prevents deformation at the change points when the rear-frame projections 19 and the molded-frame holes 21 are fitted together. In addition, the rear-frame projections 19 are placed also between the change points. This placement further prevents the deformation at the change points.

The rear-frame pockets 18, although desirably placed in the same position as and as many as the rear-frame projections 19, may increase or decrease in number as necessary, in view of the assembly performance of the backlight 3. For firmer interlock between the molded frame 9 and the rear frame 10, placing more rear-frame pockets 18 than the rear-frame projections 19 prevents the molded frame 9 from deformation resulting from a stress applied to the protector 7.

Figure 7:
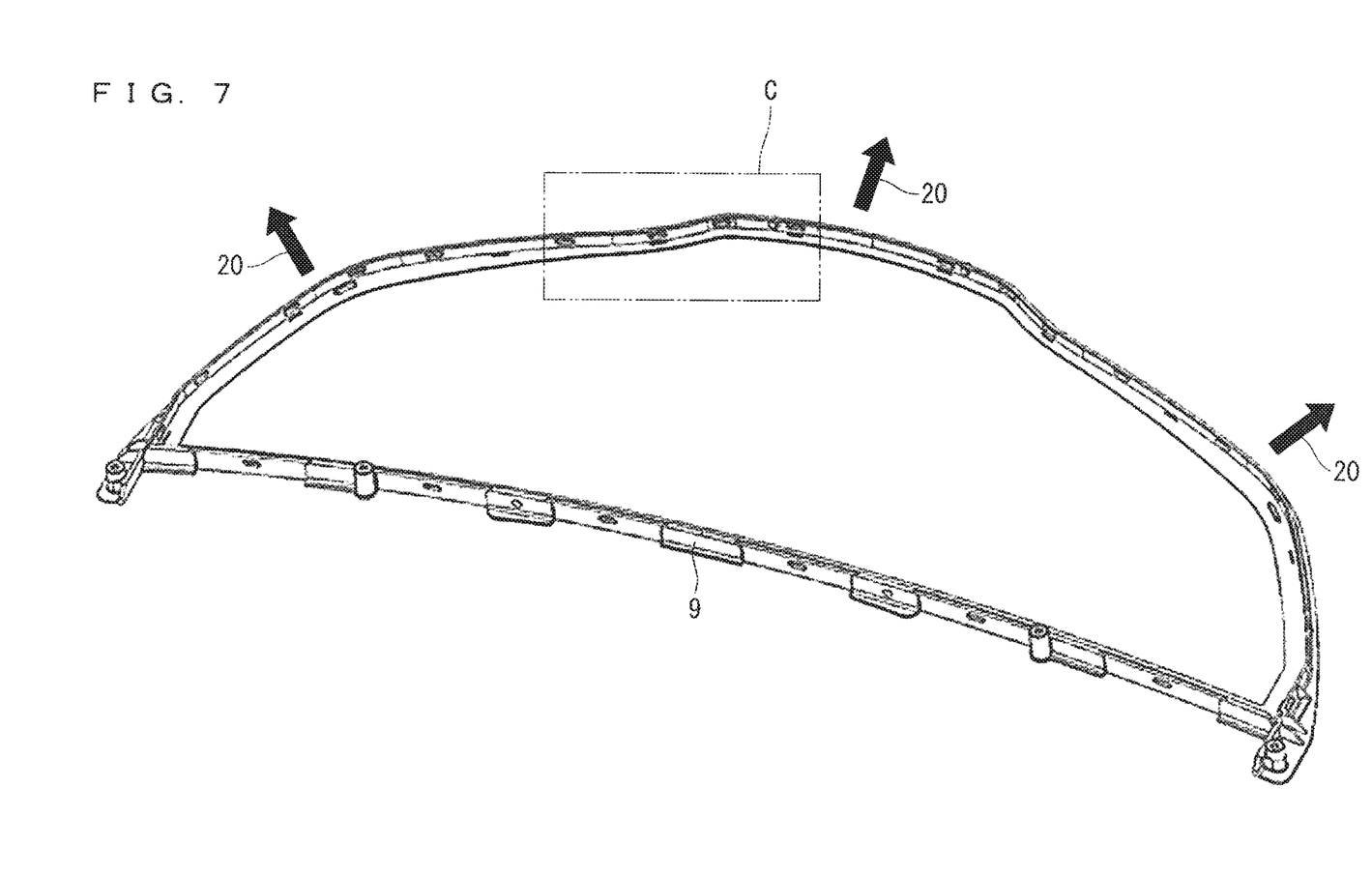
FIG. 7 is a perspective view of one example of the configuration of a molded frame according to the first preferred embodiment of the present invention.

FIG. 7 is a perspective view of the molded frame 9 viewed from behind the backlight 3. FIG. 8 is an enlarged view of a portion C in FIG. 7.

As illustrated in FIG. 7, the molded frame 9 is in advance deformed and curved into an odder shape than a rectangle. The molded frame 9 is thus apt to expand in a molded-frame expansion direction 20, which is the inward-and-outward direction, and to thus deform.

Figure 10:
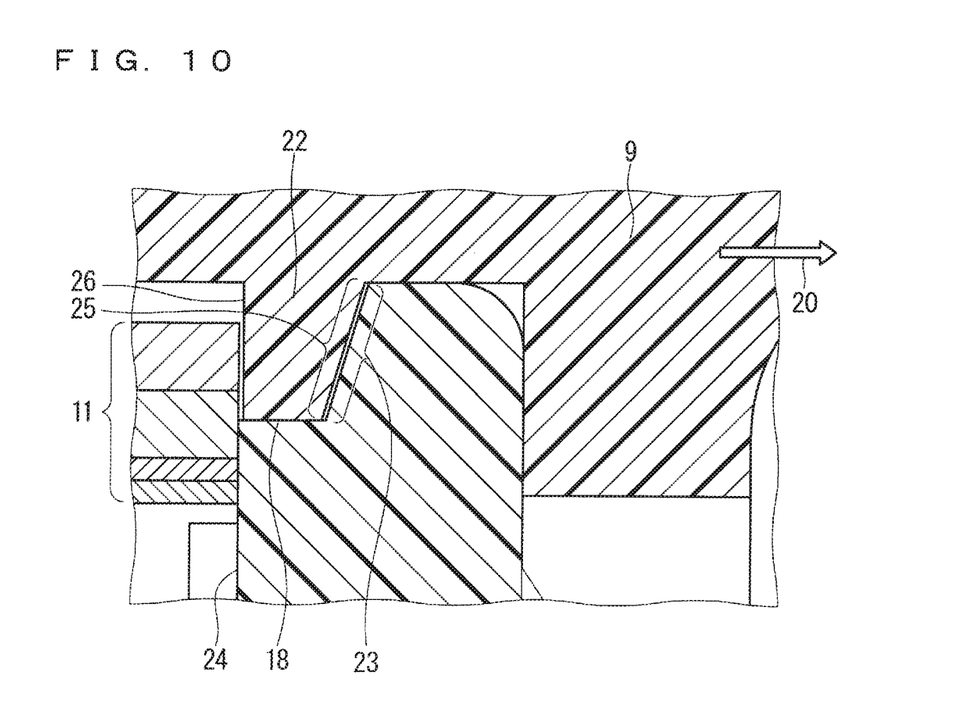
FIG. 10 is an enlarged view of a portion D in FIG. 9.

To address this problem, the molded frame 9 is provided with molded-frame projections 22 in positions corresponding to the rear-frame pockets 18 of the rear frame 10, the detail of which is illustrated in FIGS. 9 and 10. That is, the molded frame 9 has a portion forming the frame of the area light source, and has the plurality of molded-frame projections 22 selectively disposed in this portion and facing the rear frame 10 in the hack-and-forth direction. The molded-frame projections 22 are first interlocking portions.

A projection in the Specification means a structure that can be received by a pocket. The projection extends to a direction in which the pocket extends. The molded-frame projections 22 extend in the back-and-forth direction.

The rear-frame pocket 18 and the molded-frame projection 22 are interlocked, and regulate a movement in the inward-and-outward direction. This prevents the molded frame 9 from expansion and thus deformation.

Figure 8:
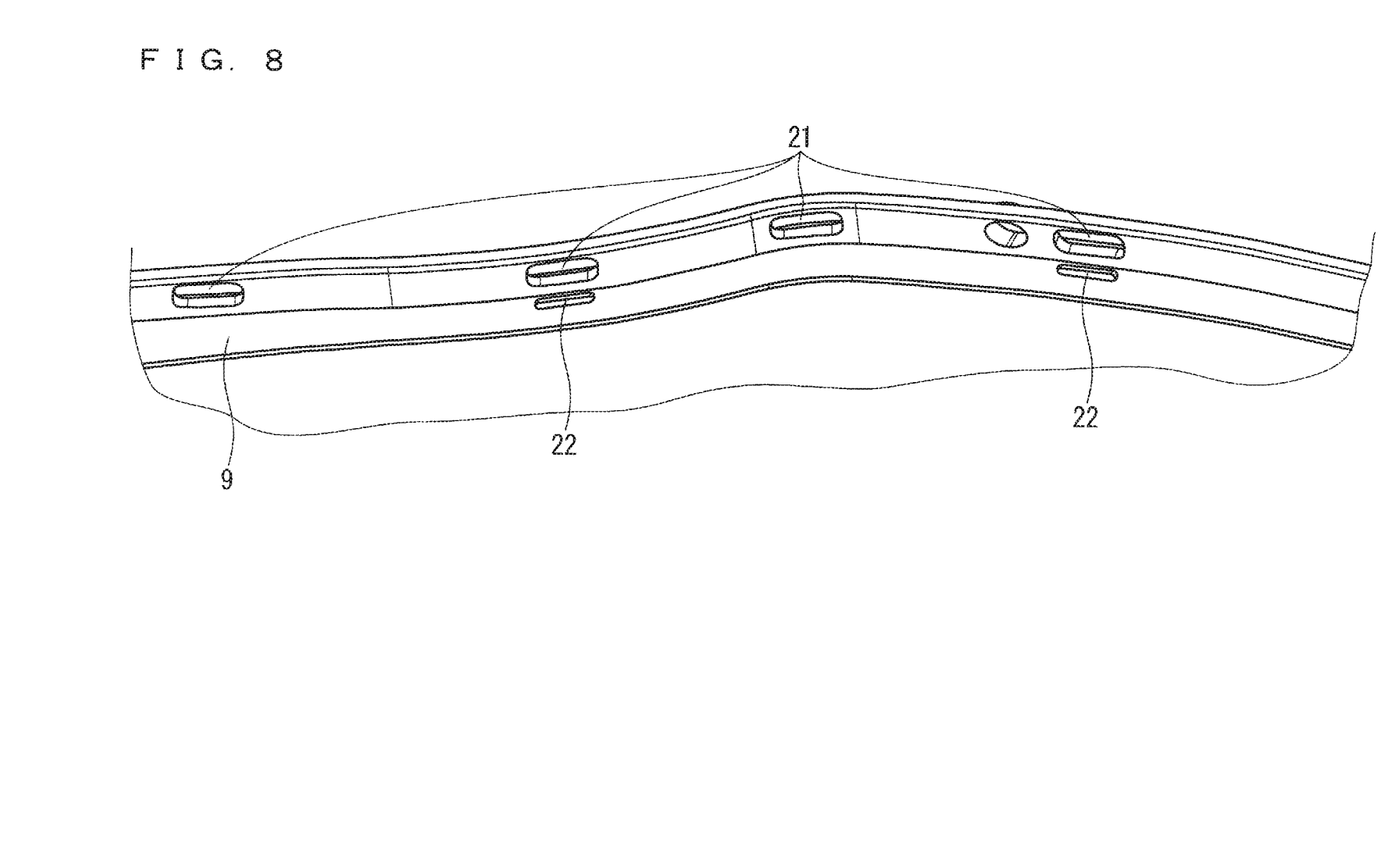
FIG. 8 is an enlarged view of a portion C in FIG. 7.

As illustrated in FIG. 8, the molded frame 9 is provided with molded-frame holes 21 in positions corresponding to the rear-frame projections 19 of the rear frame 10. Fitting the rear-frame projections 19 into the molded-frame holes 21 prevents the molded frame 9 from expansion and thus deformation.

FIG. 9 is a cross-sectional view taken along line A-A in FIG. 3. FIG. 10 is an enlarged view of a portion D in FIG. 9.

As illustrated in FIGS. 9 and 10, the rear-frame pocket 18 of the rear frame 10 and the molded-frame projection 22 of the molded frame 9 are interlocked. Moreover, the rear-frame projection 19 of the rear frame 10 and the molded-frame hole 21 of the molded frame 9 are fitted together.

As illustrated in FIG. 10, the molded-frame projections 22 of the molded frame 9 each have a molded-frame projection slope 25. That is, the molded-frame projection 22 has the molded-frame projection slope 25, which is a first slope. The molded-frame projection slope 25 is a surface in the outward direction of the inward-and-outward direction and is inclined at a predetermined angle. Moreover, the rear-frame pockets 18 of the rear frame 10 each have a rear-frame pocket slope 23 that faces the molded-frame projection slope 25 when the rear-frame pocket 18 and the molded-frame projection 22 are interlocked. That is, the rear-frame pocket 18 has the rear-frame pocket slope 23, which is a second slope. The rear-frame pocket slope 23 faces the molded-frame projection slope 25.

Once the rear-frame pocket 18 and the molded-frame projection 22 are interlocked, the movement of the molded frame 9 is regulated no matter how the molded frame 9 tries to expand in the molded-frame expansion direction 20. In addition, the rear-frame pocket slope 23 and the molded-frame projection slope 25, which are both inclined and are thus easily slipped into each other, facilitate the interlocking of the rear frame 10 and the molded frame 9.

The molded-frame projection 22, which has the molded-frame projection slope 25, is wider at its proximal end than at its distal end. Accordingly, the molded-frame projection 22 has high strength, thus preventing the molded-frame projection 22 from damage from its proximal end.

In view of strength and assembly performance, the rear-frame pocket slope 23 and the molded-frame projection slope 25 are each desirably inclined 45 to 70 degrees inclusive. In some cases, the width of the rear-frame pocket 18 in the inward-and-outward direction is equal to or more than half the thickness of the rear frame 10 in the in card-and-outward direction. As such, the rear frame. 10, when molded, can have low strength resulting from a difficulty in material filling. For this reason, the width of the rear-frame pocket 18 in the inward-and-outward direction is desirably equal to or less than half the thickness of the rear frame 10 in the inward-and-outward direction, the rear frame 10 extending in the hack-and-forth direction.

Contact should be avoided between the molded-frame projections 22 and the optical sheets 11 positioned by a rear-frame inner wall 24 at the final stage of interlocking the molded frame 9 and the rear frame 10 together after the placement of the optical members in the rear frame 10. Accordingly, molded-frame projection inner walls 26 are located more outside than the rear-frame inner wall 24, which is the inner wall of the rear frame 10 extending in the back-and-forth direction. That is, the molded-frame projections 22 each have a surface located in a more outward direction of the inward-and-outward direction than the rear-frame wall 24 extending in the back-and-forth direction, the surface being located in the inward direction of the inward-and-outward direction. The distance between the rear-frame inner wall 24 and the molded-frame projection inner walls 26 is desirably at least 0.1 mm or more.

Figure 11:
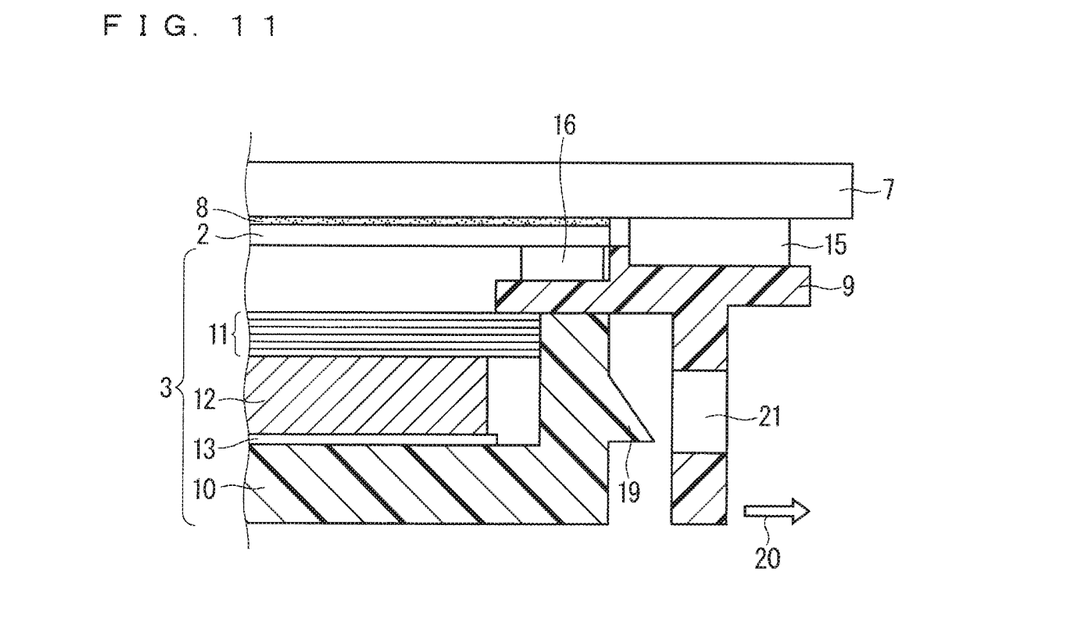
FIGS. 11 and 12 are each a cross-sectional view of one example of the configuration of a display according to a comparative example.

FIG. 11 is a cross-sectional view of one example of the configuration of a display according to a comparative example.

As illustrated in FIG. 11, the display according to the comparative example includes the molded frame 9 having no molded-frame projection 22, and the rear frame 10 having no rear-frame pocket 18. The other configuration of the display according to the comparative example is the same as the configuration of the display 1 according to the first preferred embodiment.

In the comparative example, a vibration or impact to the display during use applies a stress to the protector 7 and thus causes the molded frame 9 to expand in the molded-frame expansion direction 20, thus releasing the interlock between the molded frame and the rear frame. This release generates gaps between the components of the display. Water, dust, and other matters enter the inside of the display from the gaps, thus causing display abnormalities.

Figure 12:
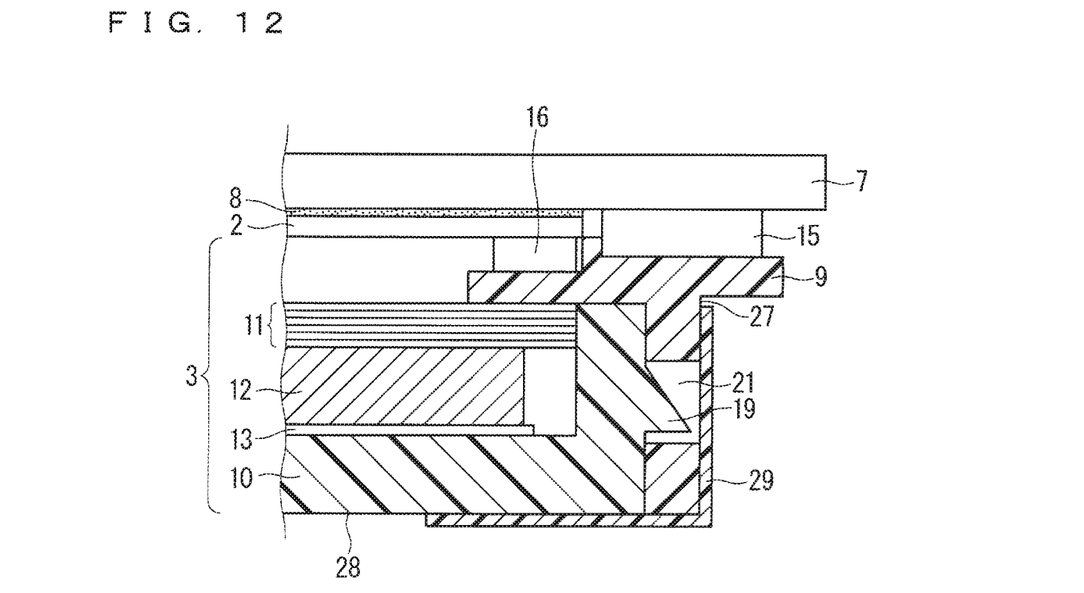

To address this problem, provided is a means for fastening the molded frame 9 to the rear frame 10 by attaching a fastening tape strip 29 from the outer peripheral surface 27 of the molded frame 9 to the bottom surface 28 of the rear frame 10. Unfortunately, age deterioration lowers tape adhesion, thus unsticking the fastening tape strip. As a result, the molded frame 9 and the rear frame 10 are no longer fastened. Consequently, gaps are generated between the components of the display. Water, dust, and other matters enter the inside of the display from the gaps, thus causing display abnormalities. In addition, fastening the molded frame and the rear frame, which requires a tape strip, is costly.

In the first preferred embodiment, the rear-frame pockets 18 of the rear frame 10 and the molded-frame projections 22 of the molded frame 9 are interlocked. This prevents the molded frame 9 from deformation to expand, and thus prevents water, dust, and other matters from entering the inside of the display. Consequently, display quality is kept.

The configuration described in the first preferred embodiment is effective, particularly in a display having an odd-shaped and curved display surface and having a narrow frame width of a display region. In addition, the display according to the first preferred embodiment requires no fastening tape strip 29, which is used in the display according to the comparative example illustrated in FIG. 12. Thus, the display according to the first preferred embodiment saves cost.

It is noted that the display surface, although having an odd shape and being curved in the first preferred embodiment, may be a rectangular and plane surface in plan view. Alternatively, the display surface may have any shape other than a rectangle in plan view, or may be rectangular and curved in plan view. Examples of the shape other than a rectangle in plan view include a trapezoidal shape and a domical shape.

Second Preferred Embodiment

The first preferred embodiment has described that the rear frame 10 has the rear-frame pockets 18, and the molded frame 9 has the molded-frame projections 22.

Figure 13:
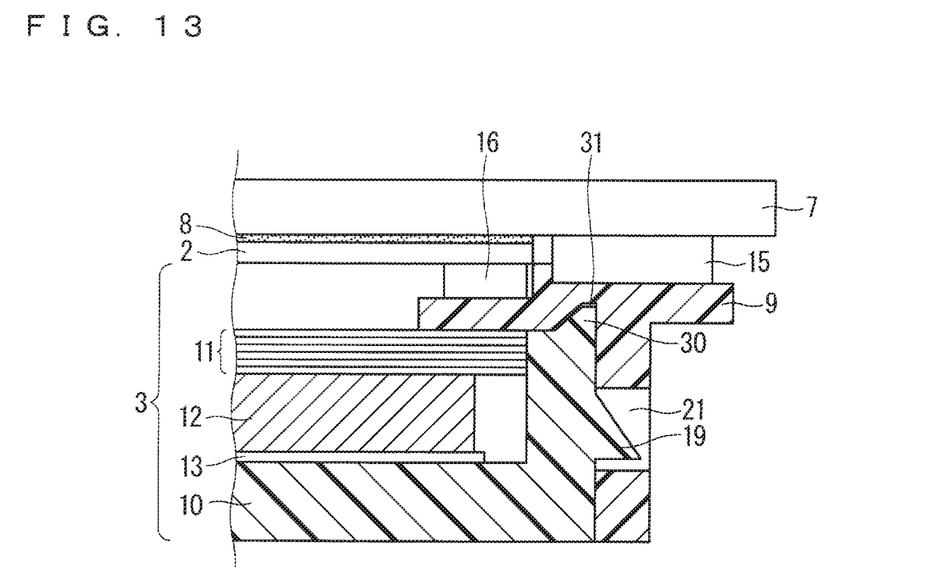
FIG. 13 is a cross-sectional view of one example of the configuration of a display according to a second preferred embodiment of the present invention.

The second preferred embodiment describes that as illustrated in FIG. 13, a rear frame 10 having rear-frame projections 30, and a molded frame 9 having molded-frame pockets 31. The other configuration in the second preferred embodiment, which is the same as the configuration in the first preferred embodiment, will not be elaborated upon here.

As illustrated in FIG. 13, the rear-frame projections 30, disposed in the rear frame 10, each have a slope whose surface in the inward direction of the inward-and-outward direction is inclined at a predetermined angle. Moreover, the molded-frame pockets 31, disposed in the molded frame 9, each have a slope that faces the slope of the rear-frame projection 30 when the molded-frame pockets 31 and the rear-frame projections 30 are interlocked. Each rear-frame projection 30 of the rear frame 10 and each molded-frame pocket 31 of the molded frame 9 are interlocked and regulate a movement in the inward-and-outward direction. Such a configuration achieves an effect similar to that in the first preferred embodiment.

Third Preferred Embodiment

Figure 14:
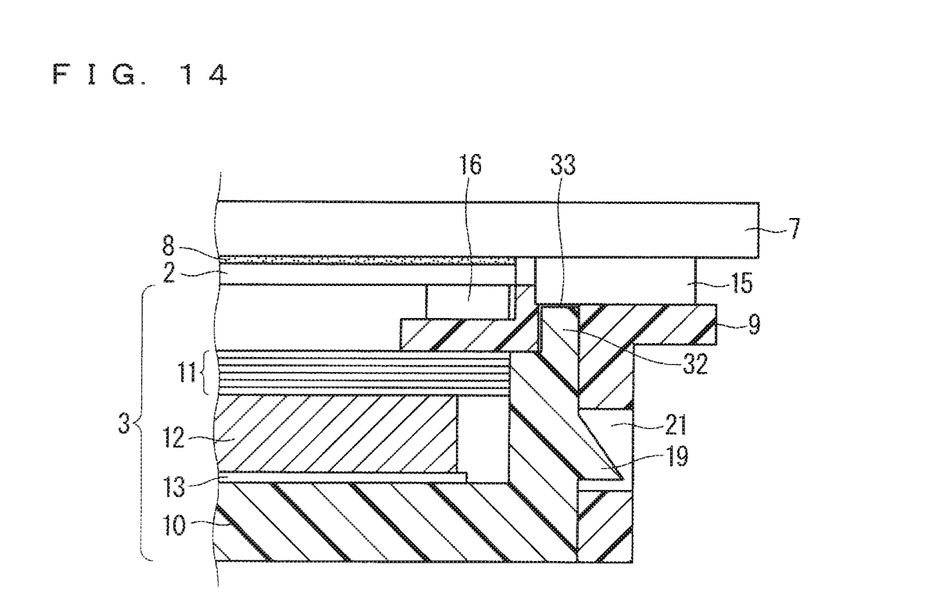
FIG. 14 is a cross-sectional view of one example of the configuration of a display according to a third preferred embodiment of the present invention.

The third preferred embodiment describes that as illustrated in FIG. 14, a rear frame 10 having rear-frame projections 32 without slopes, and a molded frame 9 having molded-frame pockets 33 without slopes. The other configuration in the third preferred embodiment, which is the same as the configuration in the first preferred embodiment, will not be elaborated upon here.

As illustrated in FIG. 14, the rear-frame projections 32, disposed in the rear frame 10, each have side surfaces perpendicular to the molded frame 9. That is, the rear-frame projection 32 extends in the back-and-forth direction. Moreover, the molded-frame pockets 33, disposed in the molded frame 9, each have an inner-wall surface facing the side surfaces of the rear-frame projection 32. Each rear-frame projections 32 of the rear frame 10 and each molded-frame pockets 33 of the molded frame 9 are interlocked and regulate a movement in the inward-and-outward direction. Such a configuration achieves an effect similar to that in the first preferred embodiment.

It is noted that the molded-frame pocket 33, although being a hole that penetrates the molded frame 9, may be any hole. For instance, the molded-frame pocket 33 may be a hole that does not penetrate the molded frame 9.

It is noted that in the present invention, the individual preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A backlight comprising:
a first frame and a second frame that hold an optical member forming an area light source from front and back sides of a light-outgoing surface of the area light source, and are configured to be positioned between a display panel and a control circuit,
wherein a direction perpendicular to the light-outgoing surface is defined as a back-and-forth direction, and a direction parallel to the light-outgoing surface is defined as an inward-and-outward direction,
wherein the first frame comprises
a first portion forming a frame of the area light source, and
a plurality of first interlocking portions selectively disposed in the first portion and facing the second frame in the back-and-forth direction,
wherein the second frame comprises
a second portion forming the frame of the area light source, and
a plurality of second interlocking portions selectively disposed in the second portion and facing the first frame in the back-and-forth direction, and
wherein each of the plurality of first interlocking portions of the first frame and each of the plurality of second interlocking portions of the second frame are interlocked such that the second frame directly contacts and holds the optical member from the back side of the light-outgoing surface, and regulate a movement in the inward-and-outward direction.

2. The backlight according to claim 1, wherein
the plurality of first interlocking portions are each a projection extending in the back-and- forth direction, and
the plurality of second interlocking portions are each a pocket extending in the back-and- forth direction.

3. The backlight according to claim 2, wherein the projection comprises a first slope that is a surface located in an outward direction of the inward-and-outward direction, the first slope being inclined at a predetermined angle.

4. The backlight according to claim 3, wherein the pocket comprises a second slope facing the first slope.

5. The backlight according to claim 2, wherein the pocket has a width in the inward-and-outward direction, the width being equal to or less than half a thickness of the second frame in the inward-and-outward direction, the second frame extending in the back-and-forth direction.

6. The backlight according to claim 2, wherein the projection comprises a surface in a more outward direction of the inward-and-outward direction than an inner wall of the second frame extending in the back-and-forth direction, the surface being located in an inward direction of the inward-and-outward direction.

7. The backlight according to claim 1, wherein
the plurality of first interlocking portions are each a pocket extending in the back-and-forth direction, and the plurality of second interlocking portions are each a projection extending in the back-and-forth direction.

8. The backlight according to claim 7, wherein the projection comprises a surface inclined at a predetermined angle, the surface being located in an inward direction of the inward-and-outward direction.

9. The backlight according to claim 7, wherein the projection extends in the back-and-forth direction.

10. A display comprising:
the backlight according to claim 1;
the display panel comprising a display surface disposed on the backlight; and
a protector disposed on the display surface of the display panel, and joined to the frame of the area light source.

11. The display according to claim 10, wherein the backlight and the display surface of the display panel curved.

12. The display according to claim 10, wherein the backlight and the display surface of the display panel each have a shape other than a rectangle in plan view.

13. A backlight comprising:
a first frame and a second frame that hold an optical member forming an area light source from front and back sides of a light-outgoing surface of the area light source,
wherein a direction perpendicular to the light-outgoing surface is defined as a back-and-forth direction, and a direction parallel to the light-outgoing surface is defined as an inward-and-outward direction,
wherein the first frame comprises
a first portion forming a frame of the area light source, and
a plurality of first interlocking portions selectively disposed in the first portion and facing the second frame in the back-and-forth direction,
wherein the second frame comprises
a second portion forming the frame of the area light source, and
a plurality of second interlocking portions selectively disposed in the second portion and facing the first frame in the back-and-forth direction, and
wherein each of the plurality of first interlocking portions of the first frame and each of the plurality of second interlocking portions of the second frame are interlocked, and regulate a movement in the inward-and-outward direction,
the first frame has an outer periphery provided with at least one projection,
the second frame has at least one hole in a position corresponding to the projection,
the projection and the hole are interlocked, and
the backlight has a shape other than a rectangle in a plan view.

14. The backlight according to claim 13, wherein a plurality of the projections is selectively disposed in the outer periphery of the first frame, a plurality of the holes is selectively disposed in positions corresponding to each of the projections, and each of the projections and the holes is at least placed at change points of changes in shape in a plan view in the first frame.

* * * * *